US010110440B2

(12) United States Patent
DeHaan et al.

(10) Patent No.: US 10,110,440 B2
(45) Date of Patent: *Oct. 23, 2018

(54) DETECTING NETWORK CONDITIONS BASED ON DERIVATIVES OF EVENT TRENDING

(75) Inventors: Michael Paul DeHaan, Morrisville, NC (US); Adrian Karstan Likins, Raleigh, NC (US); Seth Kelby Vidal, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 609 days.

This patent is subject to a terminal disclaimer.

(21) Appl. No.: 12/570,666

(22) Filed: Sep. 30, 2009

(65) Prior Publication Data

US 2011/0078302 A1    Mar. 31, 2011

(51) Int. Cl.
*G06F 15/173*    (2006.01)
*H04L 12/24*    (2006.01)

(52) U.S. Cl.
CPC ........ *H04L 41/147* (2013.01); *H04L 41/0631* (2013.01)

(58) Field of Classification Search
CPC ............... H04L 29/0818; H04L 41/147; H04L 41/0631
USPC ................................................. 709/224, 223
See application file for complete search history.

(56) References Cited

U.S. PATENT DOCUMENTS

| 7,660,815 B1 * | 2/2010 | Scofield ............ G06F 17/30702 707/999.102 |
| 7,716,011 B2 * | 5/2010 | Thibaux .............. H04L 63/1425 702/179 |

* cited by examiner

*Primary Examiner* — Suraj Joshi
*Assistant Examiner* — Joel Mesa
(74) *Attorney, Agent, or Firm* — Lowenstein Sandler LLP

(57) ABSTRACT

Embodiments relate systems and methods for detecting network conditions based on derivatives of event trending. In embodiments, a network management server can monitor the status and operation of network machines, such as servers or targets, as well as network transmission hardware (e.g. routers). Streams of network operation data from those sources can be captured and stored. The management server or other logic can examine the network operation data to identify trend lines for network conditions, such as application faults, attempted intrusions, or other events or conditions. trend line data can be treated to generate second or other higher-order derivatives, such as third-order derivatives representing the rate of change of acceleration (or jerk) in the time series of one or more conditions. The presence of acceleration or jerk for one or more trend lines, such as attempted network intrusions, can reflect an event and trigger a flag or other automated response.

24 Claims, 5 Drawing Sheets

DETECTING NETWORK CONDITIONS BASED ON DERIVATIVES OF EVENT TRENDING

FIELD

The present teachings relate to systems and methods for detecting network conditions based on derivatives of event trending, and more particularly to platforms and techniques for detecting network anomalies, potential faults, and other conditions, based on derivatives of event trending, particularly higher order derivatives of that data.

BACKGROUND OF RELATED ART

The monitoring of networks and their constituent machines to detect and isolates intrusions, faults, crashes, and other conditions is known. In large-scale networks and other settings, various network management platforms exist that can monitor and capture a steady stream of data points related to the operation of a network. Those data points can include, for example, the type, number, frequency, and distribution of machine crashes or other faults, the number and type of attempted intrusions, the identity of any detected viruses or other malicious software, and other operational network data.

Under existing management platforms, the record of network activity logged by network management servers can be examined, in real time or historically, to locate patterns or trends in that data that may indicate performance, security, or other issues. In existing platforms, the data may in general only be examined, or reports may only be run, on trends that show an increase or decrease over unit time. However, some trends, patterns, or events may only reveal themselves, or more clearly be revealed, from the change in rate (positive or negative) at which those events occur. For instance, if the rate at which attempted intrusions are occurring is increasing at an increasing rate, or accelerating, that indicator may be more significant than detecting a mere increase in that type of event. Similarly, if the rate of acceleration of certain events is changing, or jerking, that indicator may reveal other patterns or events that other, lower order trend lines do not make clear.

Further, in the tracking performed by existing network management platforms, the correlation between multiple higher-order trend lines, including in their time sequence of occurrence, is not taken into account. For instance, a trend line for attempted intrusions whose rate of jerk peaks in the same time period that regular network maintenance is performed may reveal a concerted attempt to enter the network at a time when defensive resources may be compromised. It may be desirable to provide systems and methods for detecting network conditions based on derivatives of event trending, in which higher order derivatives of trends, and/or correlation between multiple trends, can be employed to sensitively detect anomalous network event signatures.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Figure 1:
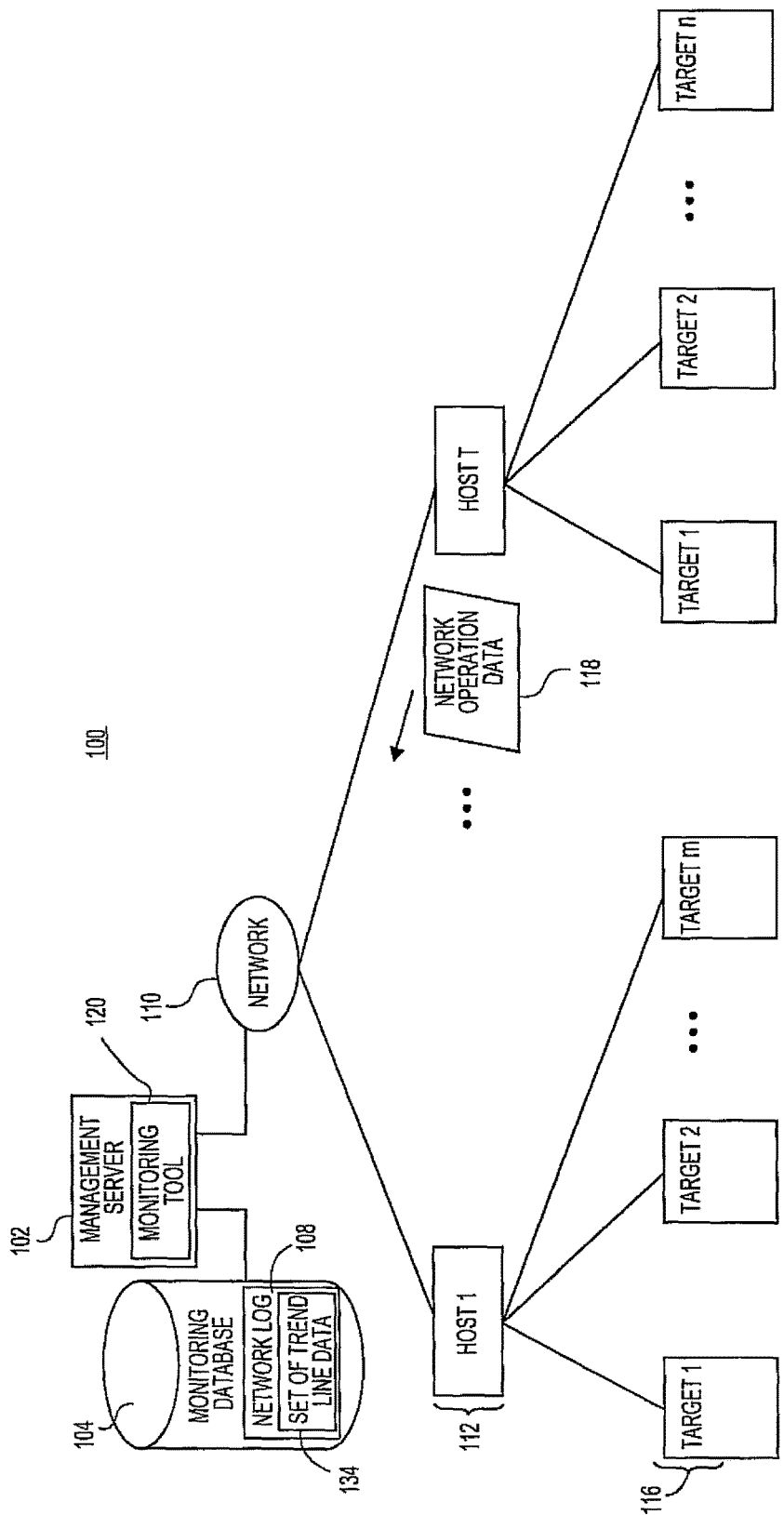
FIG. 1 illustrates an overall network in which systems and methods for detecting network conditions based on derivatives of event trending can be implemented, according to various embodiments.

Embodiments of the present teachings relate to systems and methods for detecting network conditions based on derivatives of event trending. More particularly, embodiments related to platforms and techniques for the monitoring and logging of data related to network operation data, and the identification of trends from that data. In embodiments, the network operation data can be or include any data related the operation of a managed network, including for example data collected from routers, switches, and/or network transmission hardware, software, or other resources. Data collected from those sources can include information such as data throughput rates, error rates, firewall information, and/or other data. In embodiments, the network operation data can likewise include data related to servers, hosts, targets, clients, databases, and/or other constituent machines populating the network, such as data representing the configuration state of those machines, the execution state for applications, processes, and/or services running on those machines, data related to the hardware resources of those machines, and/or other data. Network operation data can further include data related to the security state of the managed network, including detection of attempts to intrude into the network, recognition of viruses or other malware, and/or other security parameters.

In embodiments of the present teachings in further regard, the network operation data can be stored and categorized according to certain conditions or aspects of the network operation, such as amount of user traffic, number of intrusion attempts, number of downloads, the identity of ports being used for Internet or other connections, or other operational conditions or parameters. In aspects, any one or more of those conditions or parameters can be processed and analyzed to detect or identify trends, or patterns of behavior in the network. For example, a network management server or other logic can identify an increasing amount of user traffic, as measured by logins or amounts of data traffic, that peaks at a certain time and/or date. In embodiments, the network management server or other logic can generate or access a time series, or chronological log, of those or other trends in the network operation data. In aspects in further regards, the network management server or other logic can process those trends using higher-order derivatives, to detect the rate of change of rates of change of that trend line data, to develop and refine an identification of potential events. In embodiments, a second-order derivative can be applied to a time series of one or more trends to identify any acceleration in those trends. In embodiments, a third-order derivative can be applied to the same sets of data to identify that rate of change of acceleration, or jerk, present in those trends. Derivatives of other orders can be used. The network management server can be configured to detect the onset of a potential network event, incident, and/or condition based on the results to generating these higher-order derivatives of the network data trend lines. For example, the detection of jerk, or a specified threshold of jerk, in hits on a Web page or server can be used to identify an incipient or continuing denial of service (DoS) attack. Other signatures and criteria can be used to flag or identify network events, conditions, anomalies, or other behavior or states in the network under management. In embodiments in certain regards, the ability to track and analyze higher order derivatives of operation data trend lines can assist in detecting or refining the identity or nature of network conditions that might not be apparent or identifiable from the raw operation data itself.

Reference will now be made in detail to exemplary embodiments of the present teachings, which are illustrated in the accompanying drawings. Where possible the same reference numbers will be used throughout the drawings to refer to the same or like parts.

FIG. 1 illustrates an overall network 100 in which systems and methods for detecting for detecting network conditions based on derivatives of event trending can be implemented, according to various embodiments of the present teachings. In embodiments as shown, a management server 102 can communicate with a managed network 110 to carry out various detection, network management, deployment, maintenance, or other services. In embodiments, management server 102 can communicate with managed network 110 via secure or non-secure channels or connections, including, for instance, the Internet or other public or private networks. In embodiments, management server 102 can host, maintain, or communicate with a set of associated resources including a monitoring database 104, which can be or include a local or remote database or data store hosting information related to a set of hosts 112, a set of target machines 116, and/or other machines or nodes hosted in managed network 110. In embodiments, management server 102 can comprise, host, or access a monitoring tool 120 containing applications, logic, and/or other resources to receive, filter, analyze, store, and manage data related to the monitoring of machines in managed network 110, including set of hosts 112 and set of target machines 116, using network operation data 118 captured from those subject machines.

Managed network 110 can include or host a set of resources including set of hosts 112, a set of targets 116, routers, switches, databases, and/or other nodes, machines, or resources. In embodiments, set of hosts 112, set of targets 116, and/or other nodes or resources of managed network 110 can be or include virtual machines, as well as hardware-based or hardware-implemented machines. In embodiments, set of hosts 112, set of targets 116 and/or other resources of managed network 110 can be or include resources instantiated from or based on cloud-based networks. Set of hosts 112, set of targets 116, and/or other nodes or machines can be or include, for example, server machines, client machines, portable computing devices, wireless communication devices, and/or other clients, machines, or devices.

More particularly, in terms of the overall monitoring of network operations, and as shown in FIG. 1, monitoring tool 120 hosted in management server 102 can be configured to receive a set of network operation data 118 from one or more machines in managed network 110, including from any one or more machines in set of hosts 112, set of targets 116, and/or other machines or nodes. Each machine, transmission hardware such as switches or routers, and other resources of managed network 110 can transmit a set of network operation data 118 to management server 102. In aspects, set of network operation data 118 can be transmitted on a continuous, periodic, event-triggered, and/or other regular or irregular basis. In embodiments, set of network operation data 118 can be transmitted from a source machine via a wired network connection, optical connection, and/or a wireless network connection such as a WiFi™ or Bluetooth™ wireless connection.

Monitoring tool 120 can collect set of network operation data 118 form various source machines in managed network 110, and can store that data to monitoring database 104 or other data store. Monitoring tool 120 can likewise generate, access, and/or update a network log file 108 stored in monitoring database 104. Network log file 108 can store data reflecting the overall operational state of managed network 110, including configuration data, the state of executing applications or executing services in managed network 110, the occurrence, timing, frequency, and nature of various failure, fault, or other conditions that may occur in managed network 110.

In embodiments, monitoring tool 120 can analyze network operation data 118 to identify one or more types or categories of conditions or states in managed network 110, such as, for example, the number of hits to a Web page hosted in managed network 110, the number of users logged into target or other machines in managed network, the number of attempted intrusions into managed network 110, and/or other conditions or states of machines or other resources of managed network 110. In embodiments, monitoring tool can separate the logged data for one or more conditions into a set of trend line data 134, reflecting the logged history of those trends or conditions. In embodiments, monitoring tool can be configured to take a second, third, or other higher-order derivative of set of one or more trend lines in set of trend line data 134 to determine the acceleration, jerk, or other time-varying characteristics of those trends. The acceleration, jerk, or other characteristics can, in aspects, be positive or negative, indicating increasing or decreasing activity. For instance, monitoring tool 120 can determine that an amount of email traffic arriving over port 25 is experiencing rates of change reflected in non-zero third-order derivatives (or jerk), which can indicate a spam event or other irregular or undesired condition in managed network 110. Other conditions in set of trend line data 134 can be analyzed. For instance, a lack of change, or plateau, in a trend line for a predetermined period can also or instead be an indicator of an anomalous network condition. Monitoring tool 120 can be configured to determine that an event or condition reflected in set of network operation data 118 reflects a fault or other reportable or actionable condition based on comparison to predetermined threshold for acceleration, jerk, or other time-varying parameters. It may be noted that in embodiments, the analysis performed by monitoring tool 120 on network operating data 118, set of trend line data 134, and/or other data can be performed in real-time or substantially real-time. In embodiments, the analysis performed by monitoring tool 120 on network operating data 118, set of trend line data 134, and/or other data can be performed in less than real-time or substantially real-time, for example by extracting that data or other information from network log 108 and/or other sources.

Figure 2:
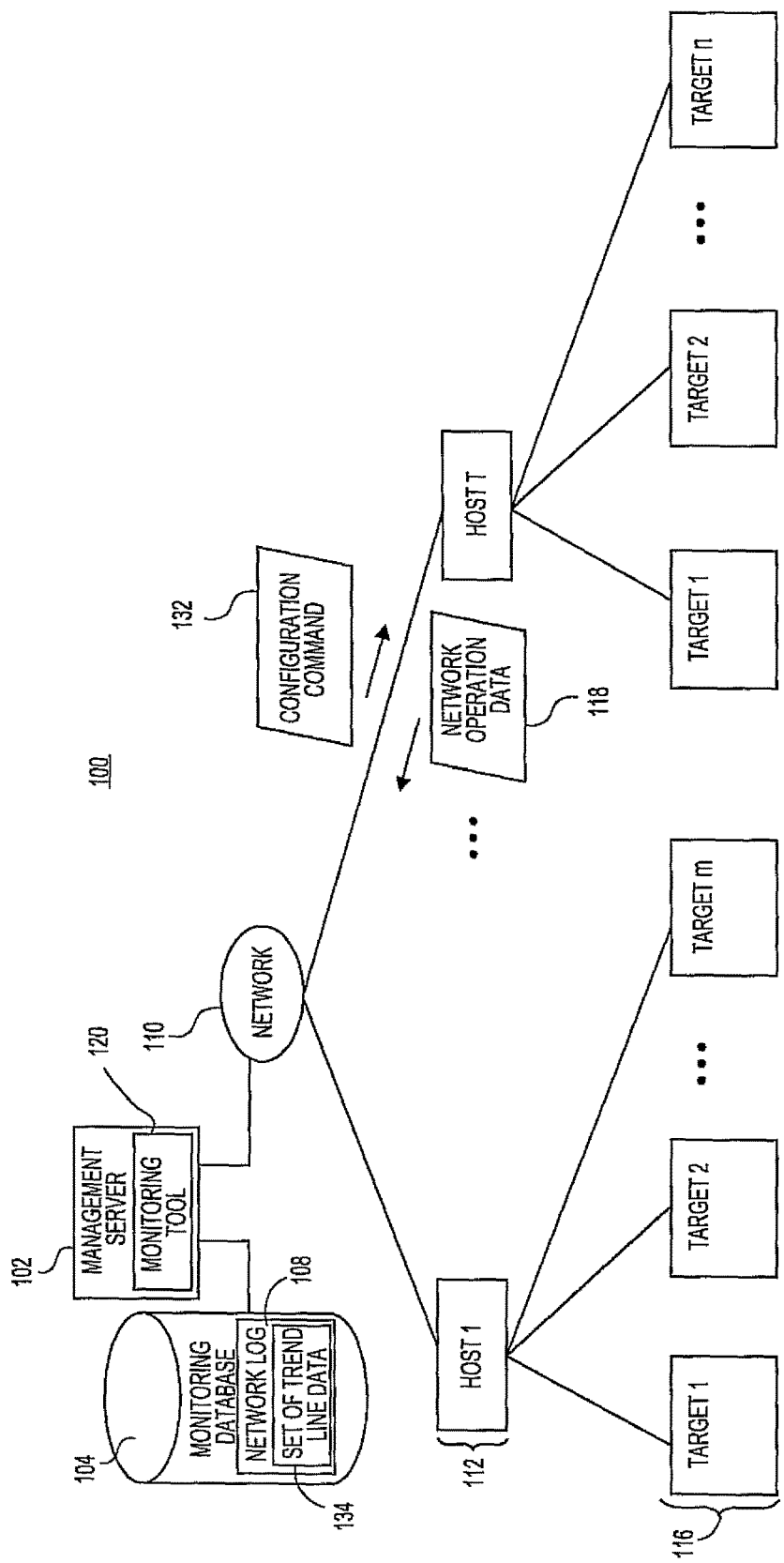
FIG. 2 illustrates an overall network in which systems and methods for detecting network conditions based on derivatives of event trending can implemented, according to various embodiments in further regards.

As shown for instance in FIG. 2, after receipt of set of network operation data 118 and performing an identification analysis on that data to detect one or more potential or actual faults, failures, trends, and/or other conditions, monitoring tool 120 and/or management server 102 can respond by issuing one or more configuration command 132 to a machine or other resource that is associated with the detected event. For instance, if the detected event relates to a potential email spam attack via port 25, that port may be temporarily shut down via configuration command 132, or other actions can be taken. If a Web server is being saturated by a peak of site hits, that server may be temporarily shut down, load balancing to other servers may be performed, and/or other actions may be taken. Other configurations, commands, instructions, and/or other responses based on detected conditions or events extracted from set of network operation data 118, set of trend line data 134, and/or other data can be used.

Figure 3:
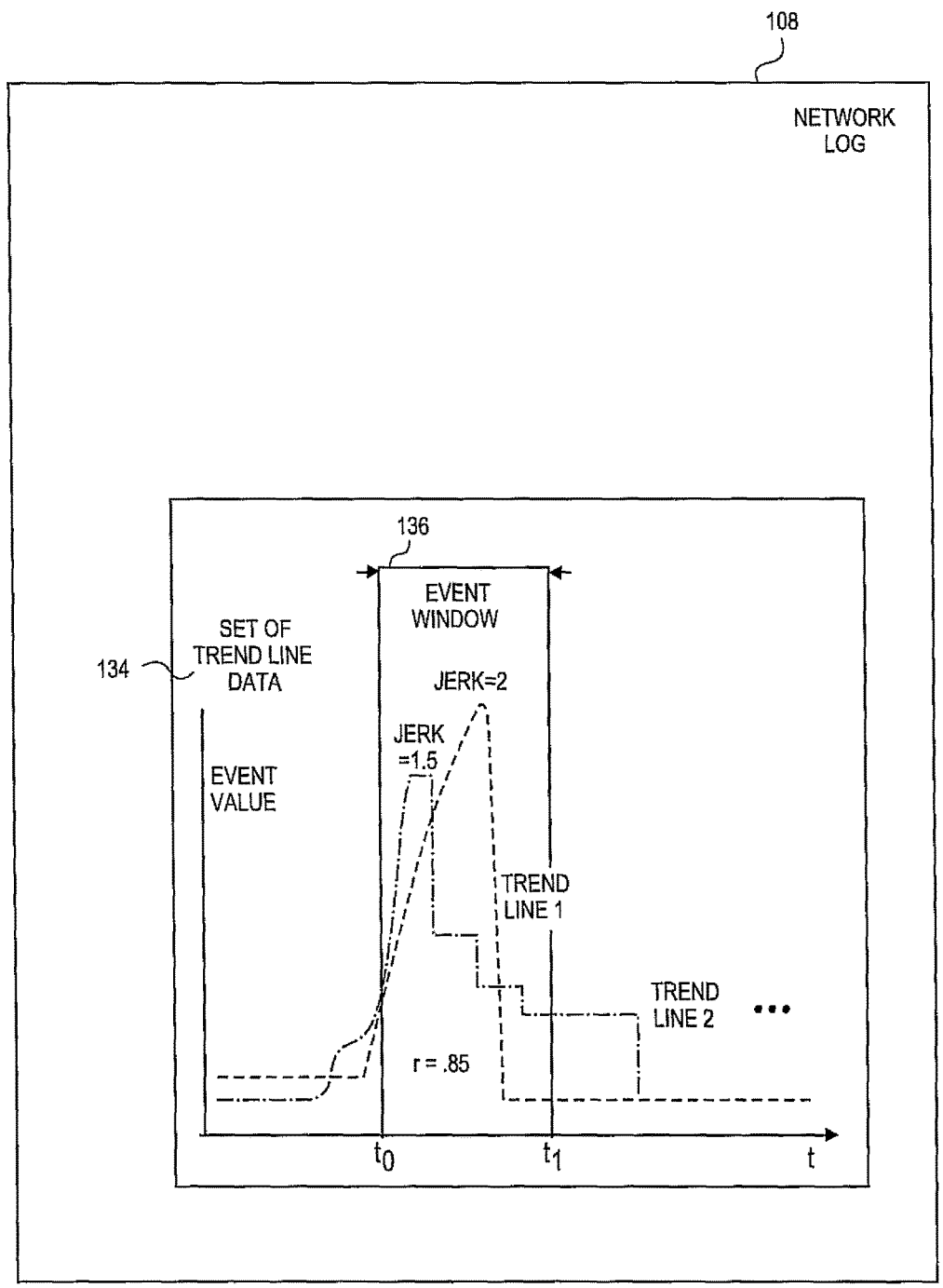
FIG. 3 illustrates an exemplary hardware configuration of a management server and associated resources, according to various embodiments.

In embodiments, and as for instance illustrated in FIG. 3, monitoring tool 120 can further process multiple trend lines within set of trend line data 134 that may be occurring at the same time, or within the same event window 136. In embodiments, the higher order derivatives of two or more trend lines to be grouped, associated, correlated or otherwise related if a peak of those derivatives occur within the same event window 136. In embodiments, the higher order derivatives of two or more trend lines to be grouped, associated, correlated or otherwise related if an average value of those derivatives each exceed a predetermined threshold within the same event window 136. Other relationships of the trend lines and/or their derivatives can be used to identify a correlation or relationship within an event window 136 or otherwise. In embodiments, monitoring tool 120 can include, use, and/or access self-learning networks to identify potential events, states, or trends, such as neural networks, fuzzy logic networks, or other logic or networks. In embodiments, event window 136 can be or include, for instance, a window, period, or interval of 1 minute, 5 minutes, 15 minutes, 1 hour, 1 day, and/or other values. In embodiments, event window 136 can be configured by a systems administrator or other user, and/or can be set automatically via monitoring tool 120 or other logic.

In embodiments, In the event that related events can be established by correlating two or more trend lines and/or their higher order derivatives within the event window 136, various management responses may be made. In embodiments as shown, if the higher order derivatives (e.g., acceleration or jerk) of two or more trend lines occur or peak within the same event window 136, monitoring tool 120 can process that correlation to identify further events or conditions, or to establish or modify a suitable response via configuration command 132 or otherwise. For instance, if monitoring tool 120 detects that a peak of the jerk value for Web site hits is taking place within the same event window 136 (e.g., one hour) as a peak of jerk value for spam influx, monitoring tool 120 may conclude that a coordinated attack on managed network 110 and/or its elements is taking place. In the case of a coordinated attack, monitoring tool 120 may turn off one or more ports, suspend access to databases within managed network 110, and/or take other protective measures until secure operation is restored.

In embodiments, the relationship between two or more trend lines and/or their higher order derivatives can also or instead be established using correlation computation, such as generating a confidence value (r value) by regression analysis or other calculations, as understood by persons skilled in the art. In embodiments, a correlated higher-order derivative match between trend lines can trigger an automated response, and/or generate alerts or notifications for systems administrator or other user response. In embodiments, monitoring tool 120 can likewise be configured to continue to analyze set of operation data 118, set of trend line data 134, higher order derivatives of that data or other data, to identify the termination of a detected condition, state or event. In embodiments, the end of a detected condition, state, or event can be indicated, for instance, by detecting an acceleration and/or jerk value that decreases to zero or below a predetermined threshold. Other criteria for the onset and end of a network event, state, or event can be used.

Figure 4:
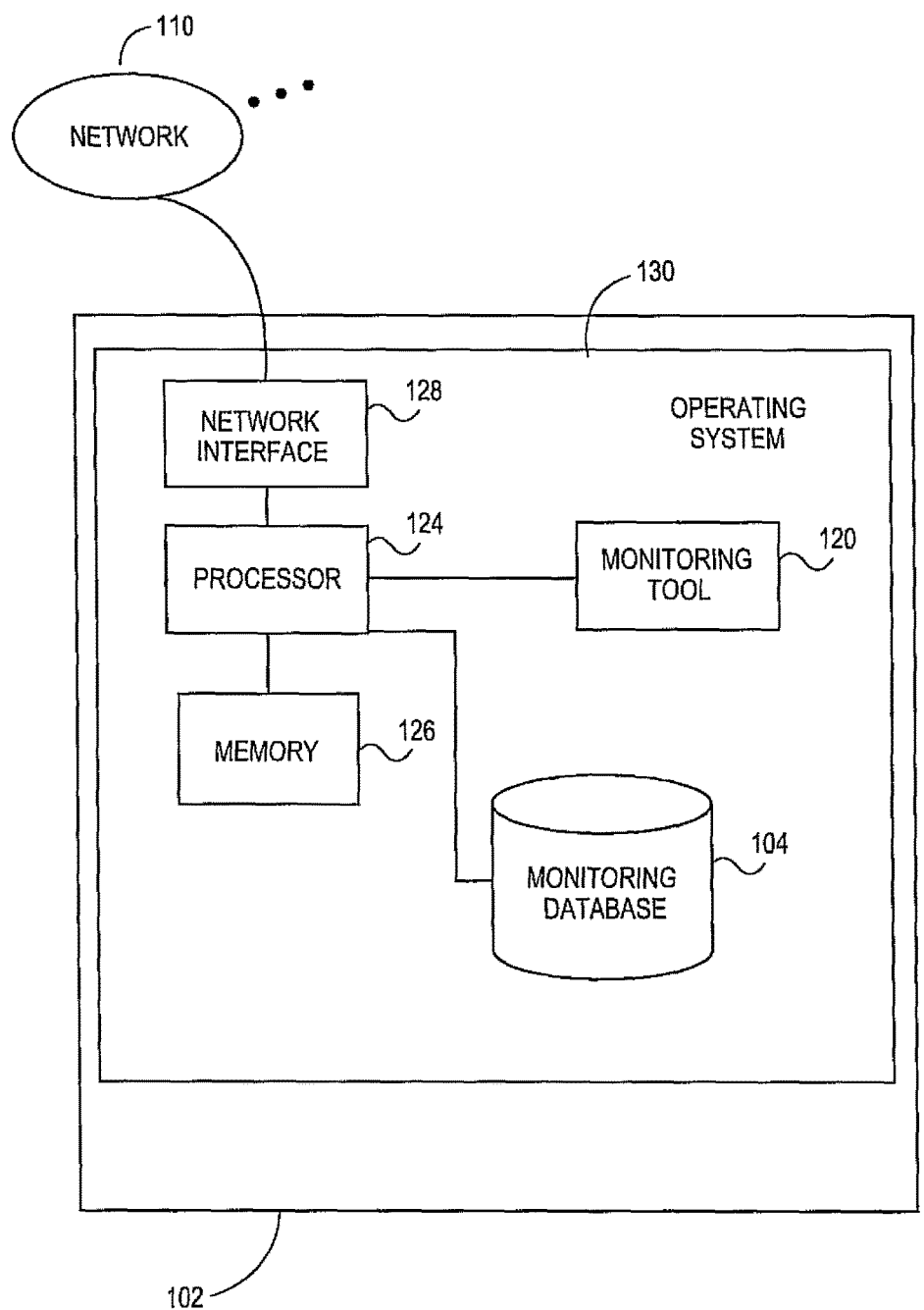
FIG. 4 illustrates a flowchart of monitoring processing that can be used in systems and methods for detecting network conditions based on derivatives of event trending, according to various embodiments.

FIG. 4 illustrates an exemplary diagram of hardware and other resources that can be incorporated in a management server 102 configured to communicate with managed network 110 including set of target machines 116, set of hosts 112, and/or other resources, according to embodiments. In embodiments as shown, the management server 102 can comprise a processor 124 communicating with memory 126, such as electronic random access memory, operating under control of or in conjunction with operating system 130. Operating system 130 can be, for example, a distribution of the Linux™ operating system, the Unix™ operating system, or other open-source or proprietary operating system or platform. Processor 124 also communicates with a monitoring database 104, such as a database stored on a local hard drive. Processor 124 further communicates with network interface 128, such as an Ethernet or wireless data connection, which in turn communicates with one or more managed network 110, which can be, include, or be accessed with via private or secure channels, and/or the Internet or other public or private networks. Processor 124 also communicates with monitoring tool 120 and/or other resources or logic, to execute operational monitoring, control, messaging, and other management processes described herein. Other configurations of the management server 102, associated network connections, and other hardware and software resources are possible. While FIG. 4 illustrates management server 102 as a standalone system comprises a combination of hardware and software, management server 102 can also be implemented as a software application or program capable of being executed by a conventional computer platform. Likewise, management server 102 can also be implemented as a software module or program module capable of being incorporated in other software applications and programs. In either case, management server 102 can be implemented in any type of conventional proprietary or open-source computer language.

Figure 5:
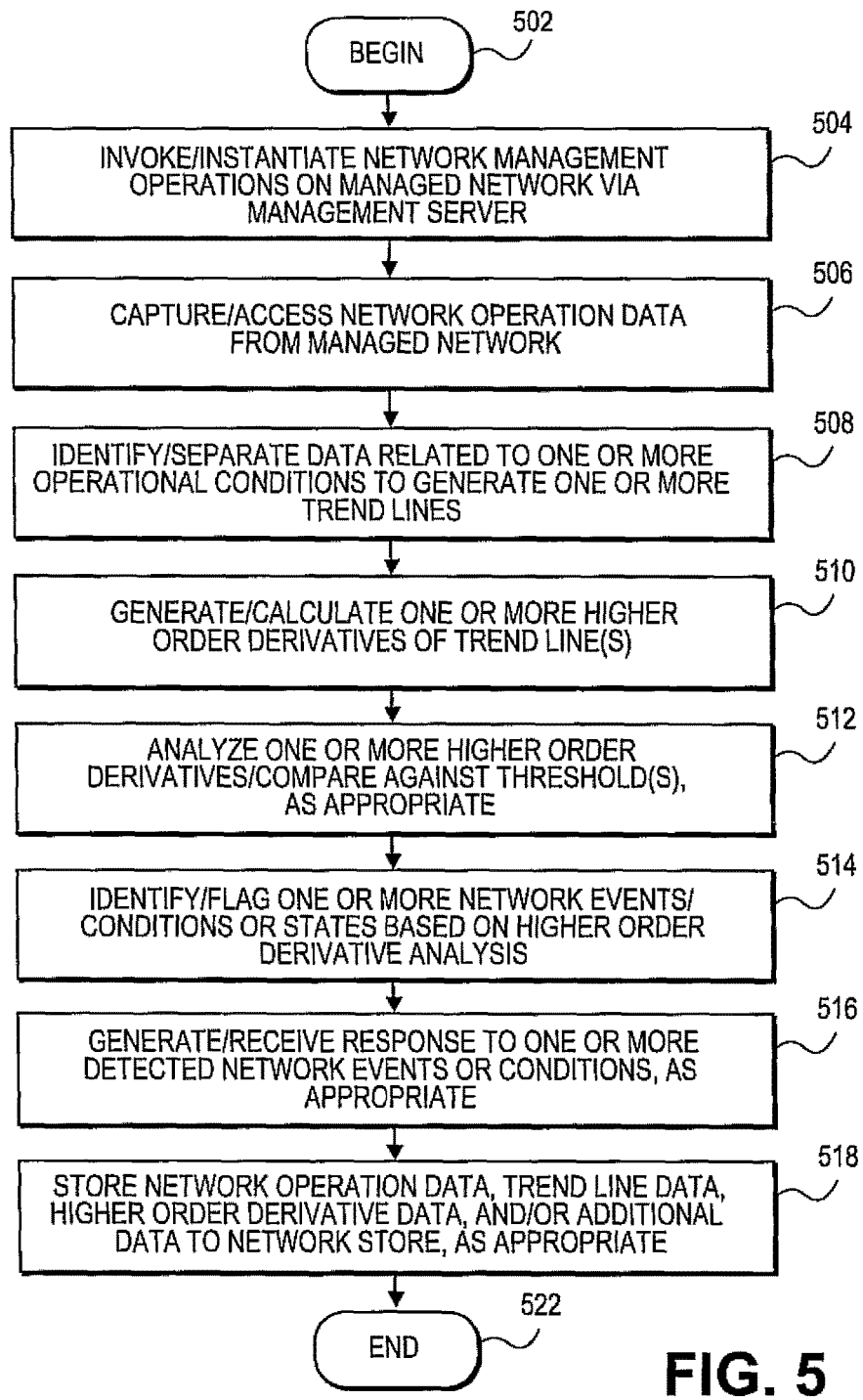
FIG. 5 illustrates a flowchart of overall processing that can be used in systems and methods for detecting network conditions based on derivatives of event trending, according to various embodiments.

FIG. 5 illustrates a flowchart of overall processing that can be used in systems and methods for detecting network conditions based on derivatives of event trending, according to various embodiments. In 502, processing can begin. In 504, network management operations can be invoked or instantiated on managed network 110 via management server 102, for instance by user selection or initiation. In 506, a set of network operation data 118 can be captured and/or accessed via monitoring tool 120 and/or other logic. In aspects, network operation data 118 can be or include any data related to or captured from managed network 110 and its constituent resources, including, for instance, data related to traffic throughput for users or the network as a whole, attempted intrusions, the execution state of software or services provided to or by machines in managed network 110, and/or other metrics, variables, logical values, or data.

In 508, monitoring tool 120 can identify, separate, and/or access data in network operation data 118 related to one or more operational conditions or services to generate one or more trends lines. For example, the number hits on a Web page can be processed and/or stored as a time series, indicating the frequency of hits per unit time over a defined period of time, such as hours of the day, a day, and/or other periods. For further example, in embodiments, monitoring tool 120 can identify the number of email transmission events occurring over port 25 or other port, within a specified day or other period. In embodiments, monitoring tool 120 can generate charts, graphs, or other representations of network operation data 120 to generate trend lines or for other purposes. Other states or conditions can be used to establish various trend lines or other historical derived from network operation data 118.

In 510, monitoring tool 120 can generate or calculate one or more higher order derivatives of one or more trend lines derived from network operation data 118. For instance, the second derivative (acceleration) or third derivative (jerk) of time series data for Web site hits, email transmissions, and/or other trend lines or data sets can be computed. In embodiments, the higher order derivatives can be calculated using numerical methods know those skilled in the art. In 512, monitoring tool 120 can analyze one or more of the higher order derivatives generated from the one or more subject trend lines to determine a state of managed network 110 or any of its constituent resources. In embodiments, for instance, monitoring tool 120 can compare third-order derivative data against a threshold value to determine if the jerk effect present in a histogram or other representation of Web site hits is equal to or above a predetermined threshold value, indicating an aggressive upswing in user hits. Other variables, derivatives, and subject data can be used. In 514, monitoring tool 120 and/or other logic, or in embodiments a systems administrator or other user, can identify or flag one or more potential or confirmed network events, conditions, or states based on the higher order derivative analysis, such as, for instance, to indicate that a denial of service (DoS) attach is underway or other events are taking place or potentially taking place.

In 516, a response can be generated or received to one or more detected network conditions, events, or states. For instance, a network port which has been identified as supporting traffic with a high degree of jerk can be shut down. In embodiments, any response can be generated automatically via network monitor 120, can be received or initiated via inputs from a systems administrator, or both. In 518, network operation data 118 and/or any trend line data 134, higher-order derivative data, and/or addition data can be stored to monitoring database 104 and/or other data store, as appropriate. In 520, processing can repeat, return to a prior processing point, jump to a further processing point, or end.

The foregoing description is illustrative, and variations in configuration and implementation may occur to persons skilled in the art. For example, while embodiments have been described which operate in a network incorporating one management server 102 communicating with managed network 110, in embodiments, more than management server 102 or related hosts can be used. Likewise, while embodiments have been described using second order and third order derivatives, in embodiments, fourth or other higher order derivatives can be used. Further, while embodiments have been described in terms of performing mathematical derivatives on trend line data 134 or other data extracted from network operation data 118, in embodiments, other metrics or functions can also or instead be used. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
   receiving network traffic data from a plurality of resources of a network;
   generating a plurality of second order derivatives for the plurality of resources of the network in view of the received network traffic data;
   identifying a first derivative of the plurality of second order derivatives having a first peak, the first derivative being associated with a first trend line of a first resource and corresponding to a first condition of the network and a second derivative of the plurality of second order derivatives having a second peak, the second derivative being associated with a second trend line of a second resource and corresponding to a second condition of the network from the plurality of second order derivatives for the plurality of resources, wherein the first derivative and the second derivative are identified in view of the first peak and the second peak exceeding a threshold during a defined interval of time and wherein the first condition is different than the second condition;
   identifying the first resource of the network associated with the first condition and the second resource of the network associated with the second condition;
   detecting, in view of the first peak and the second peak occurring during the defined interval of time, an inception of an event with respect to the network during the defined interval of time;
   generating, in view of the inception of the event, a configuration command; and
   issuing, in view of the condition, the configuration command to the first and second resources via the network.

2. The method of claim 1, wherein generating the first derivative comprises generating a derivative of at least third order.

3. The method of claim 1, further comprising:
   identifying first time series data corresponding to the first condition, the first time series data comprising at least one of machine configuration data, machine fault data, network fault data, user security data, network traffic data, or network port data.

4. The method of claim 3, wherein the first time series data comprises a time series of detected occurrences of the first condition.

5. The method of claim 1, wherein detecting the inception of the event comprises detecting the inception of the event in view of a second threshold of the first derivative.

6. The method of claim 5, wherein an acceleration associated with the first condition comprises an event termination identified in view of a third threshold value of the first derivative.

7. The method of claim 3, wherein an acceleration associated with the first condition is identified by analyzing the first time series data in at least substantially real-time.

8. The method of claim 1, wherein identifying the first derivative comprises storing the first derivative to a log.

9. The method of claim 8, wherein an acceleration associated with the first condition is identified by retrieving the first derivative from the log and analyzing the first derivative in less than substantially real-time.

10. The method of claim 1, wherein the first derivative comprises at least one of data captured from a set of target machines in the network related to an acceleration in a trend associated with a security state of the set of target machines or data captured from network transmission hardware related to the network traffic data.

11. A system comprising:
    a memory; and
    a processor, operatively coupled to the memory, to:
    receive network traffic data from a plurality of resources of a network;
    generate a plurality of second order derivatives from the plurality of resources of the network in view of the received network traffic data;

identify a first derivative of the plurality of second order derivatives having a first peak, the first derivative being associated with a first trend line of a first resource and corresponding to a first condition of the network and a second derivative of the plurality of second order derivatives having a second peak, the second derivative being associated with a second trend line of a second resource and corresponding to a second condition of the network from the plurality of second order derivatives, wherein the first derivative and the second derivative are identified in view of the first peak and the second peak exceeding a threshold during a defined interval of time and wherein the first condition is different than the second condition;

identify the first resource of the network associated with the first condition and the second resource of the network associated with the second condition;

detect, in view of the first peak and the second peak occurring during the defined interval of time, an inception of an event with respect to the network during the defined interval of time;

generate, in view of the inception of the event, a configuration command; and issue, in view of the condition, the configuration command to the first and second resources via the network.

12. The system of claim 11, wherein to generate the first derivative the processor is to generate a derivative of at least third order.

13. The system of claim 11, the processor further to:

identify first time series data corresponding to the first condition, the first time series data comprising at least one of machine configuration data, machine fault data, network fault data, user security data, network traffic data, or network port data.

14. The system of claim 13, wherein the first time series data comprises a time series of detected occurrences of the first condition.

15. The system of claim 11, wherein to detect the inception of the event the processor is further to detect the inception of the event in view of a second threshold of the first derivative.

16. The system of claim 15, wherein an acceleration associated with the first condition comprises an event termination identified in view of a third threshold value of the first derivative.

17. The system of claim 13, wherein to identify an acceleration associated with the first condition the processor is to analyze the first time series data in at least substantially real-time.

18. The system of claim 13, wherein to identify the first time series data the processor is to the first time series data to a log.

19. The system of claim 18, wherein to identify an acceleration associated with the first condition the processor is to retrieve the first time series data from the log and to analyze the first time series data in less than substantially real-time.

20. A non-transitory computer readable storage medium having instructions stored thereon which, when executed by a processor, cause the processor to:

receive network traffic data from a plurality of resources of a network;

generate a plurality of second order derivatives from the plurality of resources of the network in view of the received network traffic data;

identify a first derivative of the plurality of second order derivatives having a first peak, the first derivative being associated with a first trend line of a first resource and corresponding to a first condition of the network and a second derivative of the plurality of second order derivatives having a second peak, the second derivative being associated with a second trend line of a second resource and corresponding to a second condition of the network from the plurality of second order derivatives, wherein the first derivative and the second derivative are identified in view of the first peak and the second peak exceeding a threshold during a defined interval of time and wherein the first condition is different than the second condition;

identify the first resource of the network associated with the first condition and the second resource of the network associated with the second condition;

detect, in view of the first peak and the second peak occurring during the defined interval of time, an inception of an event with respect to the network during the defined interval of time;

generate, in view of the inception of the event, a configuration command; and issue, in view of the condition, the configuration command to the first and second resources via the network.

21. The non-transitory computer readable storage medium of claim 20, wherein to generate the first derivative the processor is to generate a derivative of at least third order.

22. The method of claim 1, further comprising capturing a set of network operation data from the network, the network operation data comprising the first derivative and wherein an acceleration associated with the first condition comprises a set of potential events.

23. The system of claim 11, wherein the processor is further to capture a set of network operation data from the network, the network operation data comprising the first derivative and wherein the processor is to identify an acceleration associated with the first condition by identifying a set of potential events.

24. The non-transitory computer readable storage medium of claim 20, wherein the processor is further to capture a set of network operation data from the network, the network operation data comprising the first derivative, and wherein to identify an acceleration associated with the first condition, the processor is to identify a set of potential events.

* * * * *